Dec. 6, 1938. H. KREIDEL 2,139,413
JOINT FOR PIPES
Filed Oct. 25, 1933 2 Sheets—Sheet 1

INVENTOR

Dec. 6, 1938. H. KREIDEL 2,139,413
JOINT FOR PIPES
Filed Oct. 25, 1933 2 Sheets-Sheet 2

Inventor,
Hans Kreidel
By Edwin R. Hutchinson Atty.

Patented Dec. 6, 1938

2,139,413

UNITED STATES PATENT OFFICE 2,139,413

JOINT FOR PIPES

Hans Kreidel, Wiesbaden, Germany, assignor, by mesne assignments, to Patex Société Anonyme, Basel, Switzerland Application October 25, 1933, Serial No. 695,077
In Germany November 26, 1932

13 Claims. (Cl. 285—122)

The subject of the present invention is a joint for pipe connections of that type in which the metal jointing member is secured solely by tightening a screw connection on the pipe and there are formed seats which holds it in the longitudinal direction. The metallic packing ring is axially displaceable on the pipe and is deformed so as to fit tightly between the pipe and the coupling members when the latter are coupled together.

According to the present invention the mouth of one of the coupling members is widened in conical or funnellike form and the end of the metallic packing ring which enters this conical mouth when the coupling members are connected together is provided with an internal peripheral recess so as to form a step. On tightening the coupling members, the thin remaining wall of the recess presses closely against and is deformed by the wall of the funnel-shaped opening of the connecting piece and the lower inner edge of the step digs sharply into the wall of the tube, so that the packing ring is pressed firmly and tightly both against the connecting piece and against the tube into which it digs.

Since the tube is gripped near its end, i. e. the deformation of the packing ring takes place a short distance behind the free end of the tube, the funnel-like widened end of the connecting piece can be made relatively flat or shallow, so that when it is necessary to release the connection for the purpose, for example, of changing the tube the latter can easily be removed backwards from the connecting piece by easing it gently.

Owing to the bending over of the end of the ring on to the tube and the relatively deep penetration of the bent-over edge into the wall of the tube at the places where the deformation occurs, all unevennesses in the surface of the tube such as weld-seams and the like, are smoothed out and a firm and tight seating is obtained. The rear end of the packing ring may be so shaped that the packing ring is deformed also at this place when the nut is tightened and bent up against the tube, but, as compared with the front part of the ring, it should not have so sharp an edge or penetrate so deeply into the wall of the tube. The tube is surrounded by the packing ring and made smooth by it over a considerable distance, so that it can no longer be strained by pressure, shocks and vibrations to such an extent as in the case of the known types of solderless connections. The new packing ring in combination with the means employed for deforming it therefore effectively obviates the disadvantages of the known devices.

Two constructional embodiments of the invention are illustrated by way of example in the accompanying drawings, in which:—

Figure 1:
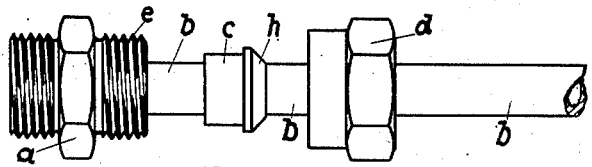
Figure 1 is a view of a separated solderless pipe connection consisting of a tubular connecting piece, a pipe inserted in this and a metallic packing ring on the latter, together with the nut for tightening the parts.

Referring to the drawings, in all figures $a$ indicates a tubular connecting piece, $b$ the tube which is to be tightly held therein, $c$ a metallic packing ring and $d$ an internally threaded nut which acts as the pressure member and can be screwed on the external thread $e$ of the tubular connecting piece $a$. The tubular connecting piece is provided with a funnel-like widened opening $f$ and the metallic packing ring $c$ is provided at the end which faces this opening with an internal recess $g$ which is open to the front and forms a step. The rear end $h$ of the metallic packing ring $c$ which is somewhat greater in diameter is conically tapered and the edge $i$ of the nut $d$ by which the pressure is exerted is rounded off.

On tightening the nut $d$ the metallic packing ring $c$ is pressed axially into the funnel-shaped widened part $f$ of the tubular connecting piece $a$, since the packing ring $c$ is more acutely angled than the funnel-shaped widening $f$. The ring thereby becomes deformed and in the first place the thin walled portion $c^1$ which remains when the internal recess $g$ has been formed is bent inwards and adapts itself to conform to the shape of the surface of the funnel-like widening $f$ of the tubular connection. The surfaces in contact are thereby polished and made to fit tightly until the end of the ring assumes exactly the shape of the funnel-like widening $f$. On tightening the nut further, the inner edge $c^2$ of the packing ring digs sharply and deeply into the surface of the pipe so that any unevenness in the surface of the pipe, such as weld-seams and the like, is counteracted and a firm and tight seating is produced. As the resistance to the tightening of the nut increases, a deformation also of the rear end of the packing ring finally takes place and the rounded edge $i$ of the nut grips the conically tapered portion of the ring and firmly embraces it, and presses it partly into the surface of the tube, so that at this place also a bending-up of the packing ring against the tube takes place but the ring does not penetrate so deeply and with so sharp an edge as at its front end. The main object of the deformation at the rear end of the packing ring is to relieve the front portion of the ring when pressures, shocks or vibration occur in the pipe. It is important that two absolutely tight joint places produced by the deformation of the packing ring should be formed, namely the place at the wall of the funnel-like widening of the connecting piece in which an absolutely tight joint is ensured owing to the surfaces which are in contact polishing one another and that at the outer wall of the tube in which the sharp inner edge $c^2$ of the packing ring presses deeply into it. Owing to the very tight and secure pressure on the tube at the latter place, the tube is prevented from being longitudinally displaced and is protected against forces tending to produce such displacement, and the connection is therefore absolutely reliable and resistant both to high pressures and alterations in the length of the tube due to temperature changes.

After releasing the nut $d$ the packing ring remains fast on the tube and the connection can be made as often as desired, that is to say the joint can be connected and disconnected.

Figure 2:
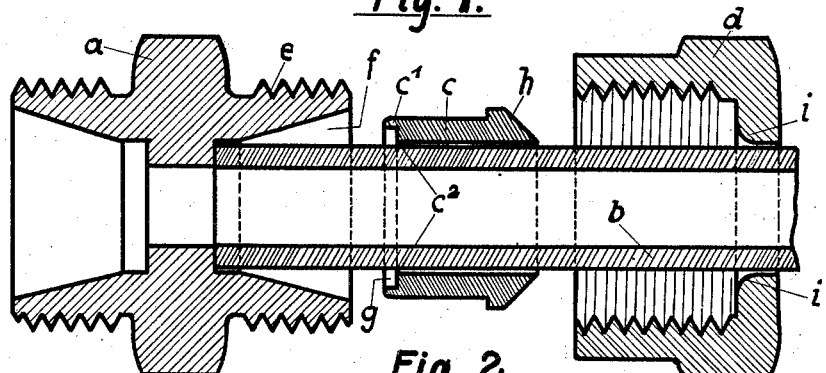
Figure 2 illustrates the pipe connection in longitudinal section and on a somewhat larger scale.
Figure 3:
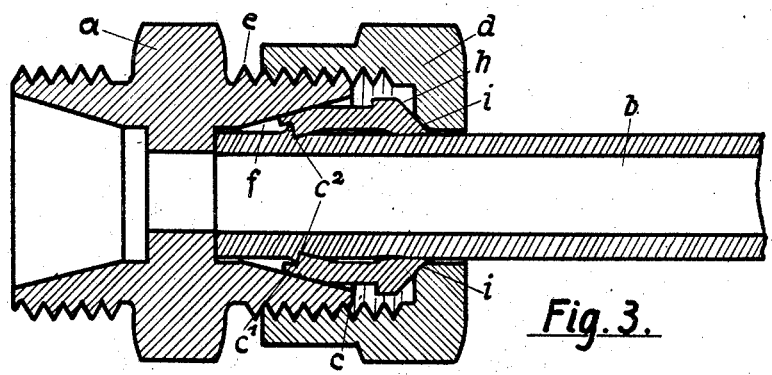
Figure 3 is a longitudinal section through the same joint in the connected condition.

It will be understood that in assembling the coupling shown in Figs. 1, 2 and 3, the tube $b$ is inserted through the flaring mouth $f$ until the end of the tube abuts the shoulder provided in the body portion $a$ adjacent the inner end of the flaring mouth $f$ (see Fig. 2). The sleeve $c$ is then moved into the flaring mouth $f$ and the nut $d$ screwed onto the threads $e$ of the body portion $a$. The nut $d$, with its screw threads which cooperate with the screw threads $e$, constitutes means for forcing the sleeve $c$ into the flaring mouth $f$ and longitudinally of the tube $b$, thereby contracting the inner end of the sleeve $c$ and causing the cutting edge $c^2$ to shear the outer surface of the tube $b$ and to form a ridge of appreciable size thereon without appreciably deforming the internal surface of the tube $b$ (see Fig. 3). The ring or sleeve $c$ abuts the last mentioned ridge at one end and the nut $d$ at its other end, becoming deformed (see Fig. 3) on tightening of the nut $d$ and acting by virtue of its inherent elasticity somewhat as a grooved washer, which prevents the parts from becoming loosened by vibration or temperature variations.

Figure 4:
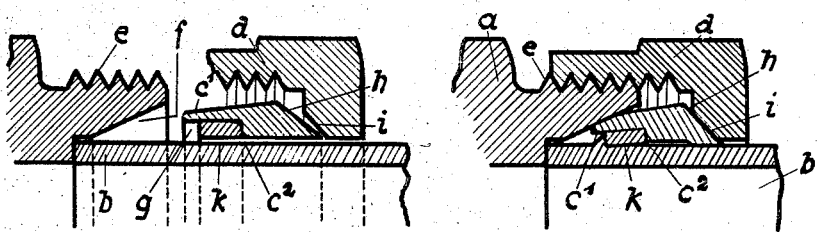
Figures 4 and 5 show in the disconnected and connected positions respectively a construction having a separate ring of a different material inserted in a internal recess in the metallic packing ring.
Figure 5:
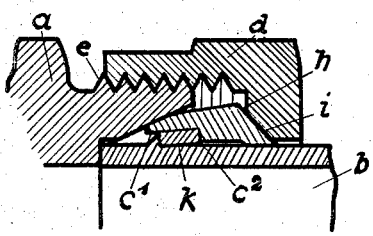

Instead of rounding the edge $i$ of the nut $d$ as shown in Figures 2 and 3, the edge $i$ may be inclined in the manner indicated in Figures 4 and 5. In this case the inclination of the edge should be at a somewhat steeper angle than that of the corresponding edge of the packing ring. The rear end of the latter may, however, be of the same shape as the front end. However, the tube must not be embraced so tightly at this end as at the front end of the ring, particularly when the tube is subjected to heavy shocks or vibration, by which it may be caused to crack or shear.

Figure 6:
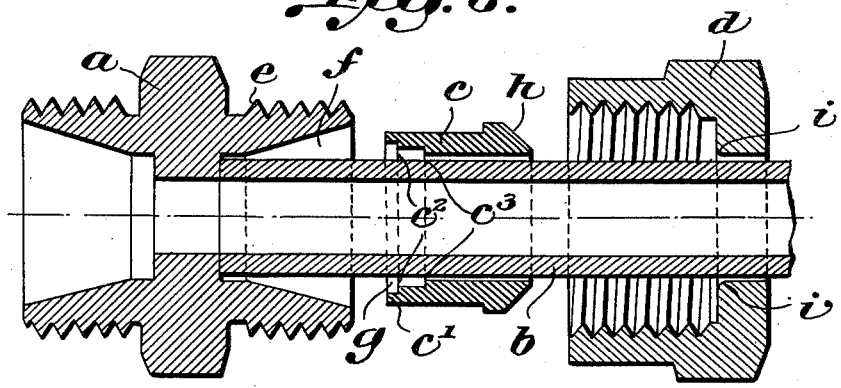
Figs. 6 and 7 are views similar to Figs. 1 and 2, but illustrating a modification.
Figure 7:
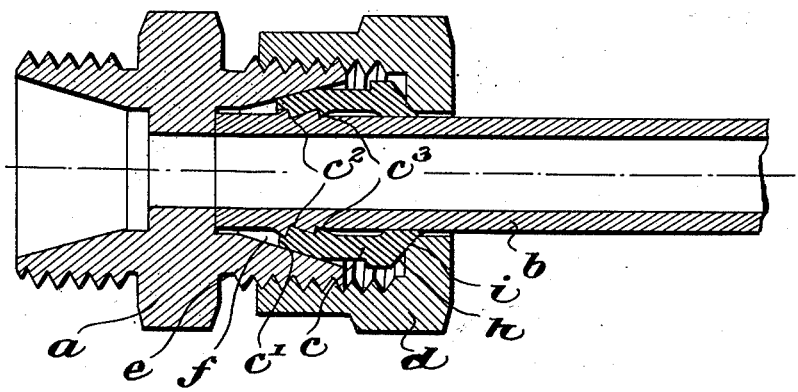

The bending or deformation of the rear end of the packing ring only serves the purpose of removing external influences, such as shocks, vibrations, bends on laying the pipe, distortions on erection and the like, from the front part of the packing ring, or of not allowing these to reach the front end. Instead of being provided with a recess having only one step, the packing ring may be provided with a recess having several steps so that, when bent-up, there are formed several places at which pressure is applied and which lie one behind the other, resembling a screw thread without a pitch. Such an arrangement is illustrated in Figs. 6 and 7, the parts of which correspond to those shown in Figs. 2 and 3 and are indicated by the same reference numerals, except the sleeve $c$ is provided with two cutting edges $c^2$, $c^3$, which provide two similar annular ridges on the exterior of the tube $b$ (see Fig. 7) instead of the single annular ridge shown in Fig. 3.

In many cases it is preferable to provide a separate packing ring which is of smaller length than the recess in the main ring and is made of a different material. This form of construction is illustrated in Figures 4 and 5. In these figures this ring is indicated by $k$. It can be made of a material which is either harder or softer than the material of the main ring $b$, according to its purpose.

When a ring of harder material than the main ring is used, the packing or deformation is effected by the lower front edge of the ring as shown in Figure 5.

I claim:

1. A tube coupling comprising a body having means for attachment to a part to which a tube is to be connected, said body having a shoulder formed therein as an abutment for the end of the tube and having a flaring mouth leading to said shoulder, a sleeve having an annular part with an edge sufficiently hard to cut into the tube, and means to force said sleeve into said flaring mouth and longitudinally of the tube thereby to contract said annular part and cause said edge to shear the outer surface of the tube and form a ridge of appreciable size thereon without appreciably deforming the internal surface of the tube.

2. A tube coupling comprising a body having a passageway extending therethrough and an annular shoulder formed therein and having a flaring opening leading to said shoulder, a tube extending into said flaring opening and having its end abutting against said shoulder, a sleeve fitting over said tube and having an internal annular recess at one end thereof, and means for forcing said recessed end of said sleeve into said flaring opening thereby to contract the end of said sleeve and cause the annular edge of said tube at the bottom of said recess to cut into said tube and form a ridge of displaced metal on the surface thereof, said ridge being received in the recess of the sleeve.

3. A tube coupling as defined in claim 1 and having a hardened metallic ring partially filling the recess in the sleeve and forming the edge which cuts into the outer surface of the tube.

4. A tube coupling as defined in claim 2 and having a hardened metallic ring partially filling the recess in the sleeve and forming the edge which cuts into the outer surface of the tube.

5. A joint for pipe connection of the type comprising two coupling members adapted to be coupled together, for example by inter-engaging screw-threaded portions, and a metallic packing ring which is axially displaceable on the pipe and is deformed so as to fit tightly between the pipe and the coupling members when the latter are coupled together, wherein the mouth of one of the coupling members is of conical shape and the end of the packing ring which enters the conical mouth and is adjacent the end of the pipe is provided with an internal peripheral recess forming a step, so that when the coupling members are coupled together, the thin remaining wall of the packing ring is deformed by the conical wall of the coupling member and the inner edge of the step digs into the surface of the pipe, and a ring of metal differing from that of the packing ring fitting in the recess of the latter.

6. A coupling for conduits comprising, a fitting having an opening to receive the end of a conduit, an abutment for the end of the conduit and an outwardly flaring wall adjacent said abutment; a sleeve having at its inner end an internal edge of sufficient hardness to cut into the conduit and a portion to engage the flaring wall of said fitting, and means cooperable with said fitting forcibly to press said latter portion of the sleeve against said flaring wall and cause said sleeve to slide longitudinally relative to said conduit and its inner edge to shear into the surface of the conduit and embed itself therein, said sleeve having a tapering portion at its outer end, said tapering portion being engaged by said means to force said outer end portion into firm contact with the conduit.

7. In a coupling for conduits, the combination of a fitting having a bore with a shoulder therein, a metallic conduit having its end within said bore and abutting said shoulder, said conduit having a ridge and groove formed in the external surface thereof, the ridge being formed by metal displaced from the groove, a metallic packing sleeve surrounding said conduit and having a portion thereof embedded in said groove and abutting said ridge, and means cooperating with said fitting to hold said sleeve and conduit therein.

8. A tube coupling comprising a body having means for attachment to a part to which a tube is to be connected, said body having a bore of smaller internal diameter than the outside diameter of the end of a tube whereby longitudinal movement of the tube into the body is limited during assembly of the coupling, said body having a flaring mouth, a sleeve having an annular part with an edge sufficiently hard to cut into the tube, and means to force said sleeve into said flaring mouth and longitudinally of the tube thereby to contract said annular part and cause said edge to shear the outer surface of the tube and form a ridge of appreciable size thereon without appreciably deforming the internal surface of the tube.

9. In a coupling for tubes and pipes, the combination of a tube receiving member having a bore with an outwardly flaring mouth and means to limit the entrance of the end of a tube into said bore, a sealing ring having a plurality of cutting edges engageable with the external wall of the tube, and means to force said sleeve into said flaring mouth to contract the portion of said sleeve bearing the cutting edges while moving the sleeve longitudinally with respect to the tube, thereby to cause said cutting edges to shear into the external wall of the tube and to cut annular grooves therein without appreciably deforming the internal surface of the tube.

10. In combination, a receiving member, a tube abutting said receiving member, a continuous sealing sleeve surrounding said tube and having a plurality of cutting edges formed thereon, and means cooperating with said receiving member to force said sleeve longitudinally of the tube while radially contracting said sleeve, thereby to cause said cutting edges to shear into the external surface of the tube and form grooves complementary to said cutting edges.

11. In a tube coupling, the combination of a body having a bore, a shoulder, and a flaring mouth leading from said bore and shoulder, a tube having its end abutting said shoulder, a sleeve surrounding said tube and having a plurality of internal cutting edges engageable with the external surface of said tube, said sleeve being of material sufficiently hard to shear said tube and being sufficiently ductile to be radially contracted to an internal diameter substantially less than the external diameter of said tube, and means for forcing said sleeve into said flaring mouth of said body, thereby to contract a portion of said sleeve and to force the cutting edges thereof into the tube and form a plurality of circumferential grooves in the tube by shearing the metal thereof and displacing the metal to form ridges upon the tube of diameter greater than that of the tube.

12. As an article of manufacture, a sleeve for couplings comprising a continuous hollow cylinder having a plurality of internal annular cutting edges at longitudinally spaced sections of different wall thickness, said sleeve being of sufficiently ductile metal to permit said cutting edges to be contracted and sufficiently hard to permit said cutting edges to shear into the external surfaces of a tube.

13. A tube coupling comprising a body having a tube receiving bore terminating in an outwardly flaring frusto-conical enlargement, a tube in said bore, means on said body for limiting the distance said tube can extend into said bore, a sleeve surrounding said tube and having a pair of annular cutting edges of diameter slightly greater than that of said tube, and means to force said sleeve into said frusto-conical enlargement thereby to contract said cutting edges while they are being moved longitudinally with respect to the tube and cause said edges to shear into the external surface of the tube and cut annular grooves therein for the reception of said edges

HANS KREIDEL.